United States Patent
Drochon et al.

(10) Patent No.: US 12,459,229 B2
(45) Date of Patent: Nov. 4, 2025

(54) LAMINATE COMPRISING A SUPPORT ELEMENT AND AN ELEMENT HAVING LOOPS WHICH ARE FIXED TO ONE ANOTHER, IN PARTICULAR CALENDERED TO ONE ANOTHER

(71) Applicant: APLIX, Le Cellier (FR)

(72) Inventors: Sylvain André Paul Drochon, Carquefou (FR); Nathalie Christine Michèle Marie Moinard, Sainte Luce sur Loire (FR)

(73) Assignee: APLIX, Le Cellier (FR)

( * ) Notice: Subject to any disclaimer, the term of this patent is extended or adjusted under 35 U.S.C. 154(b) by 338 days.

(21) Appl. No.: 17/281,023

(22) PCT Filed: Nov. 6, 2019

(86) PCT No.: PCT/EP2019/080365
§ 371 (c)(1),
(2) Date: Mar. 29, 2021

(87) PCT Pub. No.: WO2020/099205
PCT Pub. Date: May 22, 2020

(65) Prior Publication Data
US 2021/0339500 A1    Nov. 4, 2021

(30) Foreign Application Priority Data

Nov. 14, 2018    (FR) ..................................... 18 71514

(51) Int. Cl.
*B32B 7/05*        (2019.01)
*B32B 5/02*        (2006.01)
(Continued)

(52) U.S. Cl.
CPC ................ *B32B 7/05* (2019.01); *B32B 5/022* (2013.01); *B32B 5/04* (2013.01); *B32B 5/266* (2021.05);
(Continued)

(58) Field of Classification Search
CPC  B32B 7/05; B32B 5/266; B32B 5/022; B32B 5/04; B32B 37/1054;
(Continued)

(56) References Cited

U.S. PATENT DOCUMENTS

| | | | | |
|---|---|---|---|---|
| 2008/0260989 A1* | 10/2008 | Lester | .................... | D04H 1/559 |
| | | | | 428/100 |
| 2014/0039434 A1* | 2/2014 | Xu | .......................... | A61L 15/24 |
| | | | | 604/367 |
| 2014/0088535 A1* | 3/2014 | Xu | .................... | A61F 13/15731 |
| | | | | 604/366 |

FOREIGN PATENT DOCUMENTS

| | | | |
|---|---|---|---|
| CA | 2940805 A1 | 10/2015 | |
| EP | 2898129 A1 | 7/2015 | |

(Continued)

OTHER PUBLICATIONS

International Search Report mailed Jan. 15, 2020 in related application No. PCT/EP2019/080365.

*Primary Examiner* — Maria V Ewald
*Assistant Examiner* — Ethan Weydemeyer
(74) *Attorney, Agent, or Firm* — Renner, Kenner, Greive, Bobak, Taylor & Weber (57) ABSTRACT

Laminate comprising a support component (1) in the form of a first layer of fibres and/or filaments, in particular a first non-woven fabric, and a component (2) with loops in the form of a second layer of fibres and/or filaments, in particular a second non-woven fabric with loops, the two components being fastened to one another, wherein the fastening causes so-called calendering islands (3, 3') to appear on the (Continued)

external surface of the component with loops in the shape of an S with symmetrical heads, characterised in that each S-shaped island with symmetrical heads consists of two sub-islands (3A, 3B; 3'A, 3'B) forming opposite heads and an intermediate, non-fastened region (4; 4') separating the two sub-islands forming opposite heads.

21 Claims, 7 Drawing Sheets (51) Int. Cl.
*B32B 5/04* (2006.01)
*B32B 5/26* (2006.01)
*B32B 37/10* (2006.01)
*A61F 13/62* (2006.01)
*D04H 1/559* (2012.01)

(52) U.S. Cl.
CPC ........ *B32B 37/1054* (2013.01); *A61F 13/627* (2013.01); *B32B 2250/20* (2013.01); *B32B 2305/20* (2013.01); *B32B 2555/02* (2013.01); *D04H 1/559* (2013.01)

(58) Field of Classification Search
CPC ............ B32B 2250/20; B32B 2305/20; B32B 2555/02; D04H 1/559; A61F 13/627
See application file for complete search history.

(56) References Cited

FOREIGN PATENT DOCUMENTS

| WO | 2008130807 A1 | 10/2008 |
| WO | 2013084692 A1 | 6/2013 |

\* cited by examiner

LAMINATE COMPRISING A SUPPORT ELEMENT AND AN ELEMENT HAVING LOOPS WHICH ARE FIXED TO ONE ANOTHER, IN PARTICULAR CALENDERED TO ONE ANOTHER

TECHNICAL FIELD

The present invention refers to a laminate comprising a support component in the form of a first non-woven fabric and a component with loops in the form of a second non-woven fabric with loops, the two non-woven fabric components being fixed to one another by calendering, the calendering forming the external surface of the non-woven fabric with loops with the calendering islands spaced apart from one another.

The present invention also refers to an engraved roller to form the calendering islands during calendering, and also to a facility comprising an engraved roller of this type.

BACKGROUND

It is known from prior art, in particular from international application WO 17190717, that laminates of this type, in which the calendering islands are in the shape of an S with symmetrical heads, the islands being arranged in rows and columns on the external surface of the non-woven fabric with loops. Although this arrangement of S-shaped islands in rows and columns has the advantage of giving a visual impression of greater softness, in particular by the creation of a type of stroboscopic effect, a laminate of this type is desirable that, while preserving the visual effect of imagined greater softness to the touch, is also in fact softer to the touch.

SUMMARY OF THE INVENTION

The present invention also refers to a laminate comprising a support component in the form of a first web of fibres and/or filaments, in particular a first non-woven fabric, and a component with loops in the form of a second web of fibres and/or filaments, in particular of a second non-woven fabric with loops, the two components being fixed to one another, the fixing causing so-called S-shaped calendering islands with symmetrical heads to appear on the external surface of the component with loops, characterised in that each S-shaped island with symmetrical heads comprises two sub-islands forming opposite heads and an intermediate, non-fixed region separating the two sub-islands forming opposite heads.

By providing an island in this way in the form of a truncated S in an intermediate, in particular central, part not only is a laminate obtained in which the two non-woven fabric components, support and with loops respectively, are fastened to one another equally well by calendering as in the prior art, but also firstly a larger effective area with loops and secondly, in the case where the islands are arranged in rows and columns, in general in the direction CD and MD, permits the creation of pathways on the upper surface of the laminate in the form of straight lines that extend from one side of the laminate to the other without intersecting the calendered region. According to the invention, in particular not only vertical lines of this type, but also lines inclined to the left and lines inclined to the right are obtained. This results in a much softer sensation to the touch than in the prior art, while retaining good coupling performance.

Preferably, each sub-island has an unsymmetrical shape, either with respect to a point, or with respect to a straight line.

Preferably, the two sub-islands are of the same shape, and preferably this same shape is not symmetrical, in particular neither with respect to a point nor with respect to a straight line. Same shape means that the shape of one sub-island in relation to another is similar or identical.

Preferably, each unsymmetrical sub-island comprises an essentially elongated base part, in particular in the direction CD, and a spout projecting from the base part, in particular from the end of the base part, extending from it in a direction forming an angle with respect to the direction of the length of the base part, in particular at an angle of between 30° and 60°, in particular about 45°.

Preferably, each sub-island is bounded by a peripheral closed line comprising successively a first essentially straight base section; an intermediate base section essentially perpendicular to the first base section; a second essentially straight base section slightly inclined to the first base section, in particular at an angle of 3°, that may be between 1° and 10°; a first section with a tip inclined to the second base section in a direction opposite to the first base section, in particular at an angle of 55°, that may be between 45° and 80°; an intermediate tip section, inclined to the first tip section towards the edge of the first base section, in particular at an angle of 81°, that may be between 75° and 110°; and a second tip section, inclined to the intermediate tip section, in particular at an angle of 87°, that may be between 85° and 120°, the second tip section rejoining the first base section and inclined to it, in particular at an angle of 70°, that may be between 60° and 90°.

According to a preferred method of implementation of the invention, the S-shaped calendering islands are aligned in the rows and columns, in particular in the direction MD and the direction CD, or in directions each inclined at an angle of between 1° and 10° to the directions MD and CD respectively.

In particular, the arrangement of the islands is such that it is possible to draw straight lines crossing the upper surface of the laminate in at least three different directions not parallel to each other, without encountering another calendered region in particular in four directions.

Preferably, the at least three lines comprise four lines, that is a vertical line in the direction MD, or essentially in the direction MD, a horizontal line in the direction CD, or essentially in the direction CD, and two inclined lines intersecting each other each forming an angle of between 10° and 35° to the direction CD, more particularly between 10° and 30°, in particular between 15° and 25°, in particular about 21°.

In particular, there are two types of island, that is an S-shaped island, called positive, and a reverse, or mirror image S-shaped island, called negative, a given row comprising a succession of positive and negative islands and the following and preceding rows comprising a succession of negative and positive islands, rows therefore comprising alternate negative and positive islands.

Preferably, between each row, there is an offset island or sub-island, so that each column comprises alternating positive and negative sub-islands, while the preceding and following columns comprise alternating sub-islands of a positive island and negative island.

In particular, the area of the component with loops covered by calendering islands represents between 18% and 34% of the area of the non-woven fabric with loops, more particularly between 20% and 25% of the area of the component with loops.

The present invention also relates to an engraved roller designed to press, in particular when hot, the two webs of fibres and/or filaments together, in particular the two non-woven support and looped fabrics to fasten them together, in particular by calendering, the engraved roller comprising patterns projecting from its external surface, the patterns having shapes that match the truncated S-shaped islands of the laminate according to the invention.

The present invention also relates to a calendering facility for a laminate according to the invention, the facility comprising a supporting or pressing roller and an engraved roller, in particular an engraved roller according to the invention.

Preferably, the peripheral speed of the engraved roller, in particular the upper roller, is controlled to be greater than the peripheral speed of the support roller, in particular the lower roller, preferably by a ratio of between 1.1 and 1.5, in particular between 1.1 and 1.3.

BRIEF DESCRIPTION OF THE DRAWINGS

For example, a preferred method of implementation of the invention is now described by referring to the drawings, in which.

DETAILED DESCRIPTION OF THE INVENTION

Figure 1:
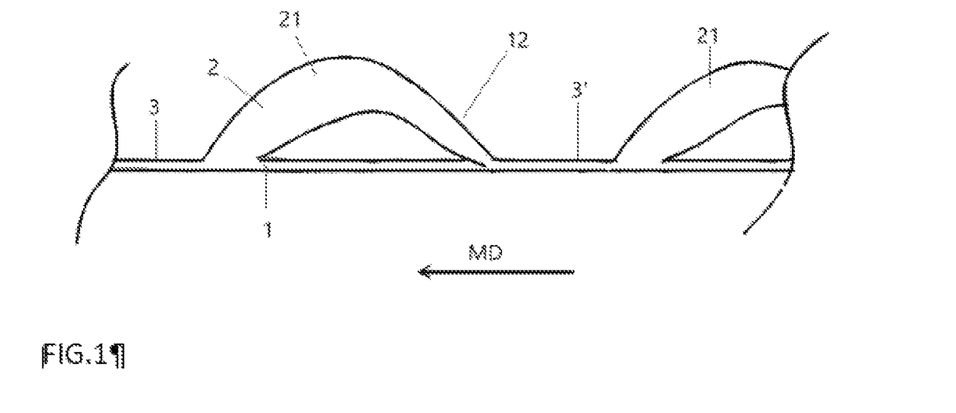
FIG. 1 shows a longitudinal cross section of a laminate according to one method of implementation of the invention.

FIG. 1 shows a laminate 12 according to the invention. The laminate 12 comprises a lower support component 1 in the form of a non-woven fabric, in particular a non-woven fabric of the "Spunbond" or "spunmelt" type (the non-woven "spunmelt" fabric being of any type including in particular SM, SMS, SSMMS, SMSMS, SMMMS, SMMS, SSMMSS, SSMMMSS, SSMMMSSS non-woven fabric or any other combination of S and M layers, S representing a layer of the "Spunbond" type and M representing a layer of the "Meltblown" type), with, for example, a basic weight, of between 5 g/m$^2$ and 30 g/m$^2$, on which in particular decorative/informative patterns can be printed, and a component 2 with loops, in particular carded, for example heat bonded, hydroentangled, or spunbond, with a basic weight, for example, of between 10 g/m$^2$ and 35 g/m$^2$ and with fibres and/or filaments between 1.5 and 6.0 decitex, and which, preferably, must enable a user to see through it the patterns printed on the support component.

The two non-woven fabrics may have been passed between two rollers, support and engraved respectively, to fasten them to one another by having fused the fibres and/or filaments (synthetic or not) of the two non-woven fabrics to one another in regions in the form of reverse S and S islands 3, 3' respectively, corresponding to the engraved patterns produced by the outer surface of the engraved roller.

Classically, fastening is done by calendering, that is by the application of pressure and/or heat to the two components passing between the rollers. However, the fibre or filament materials of the two components can also be fastened to one another by fusion welding, ultrasonic welding, embossing or similar. In the present application, to facilitate description, the fastening regions are called "calendering regions". As a variant of this implementation, extruding fibres and/or filaments directly onto the support component is a possibility (for example a non-woven fabric of the "spunmelt" or "Spunbond" type) and calendering the layer of fibres and/or filaments with the support component to form a laminate according to the invention. As a variant of this implementation, extruding fibres and/or filaments forming a first layer of fibres and/or filaments forming the support component is a possibility then extruding fibres and/or filaments forming a second layer of fibres and/or filaments forming a component with loops and calendering the at least two layers of fibres and/or filaments forming the support component and component with loops to form a laminate according to the invention.

The thickness of the islands 3, 3' (measured perpendicular to the upper surface of the laminate) is, because of the calendering, greatly reduced with respect to the thickness of the laminate outside the calendering regions. The non-calendered regions thus form regions forming loops extending beyond the islands 3, 3' and able to receive hooks for hook and loop fastening.

In particular, the area of the non-woven fabric 2 with loops covered with calendering islands represents between 18% and 34% of the area of the non-woven fabric 2 with loops, in particular 20% to 25%, for example 22%.

Figure 2:
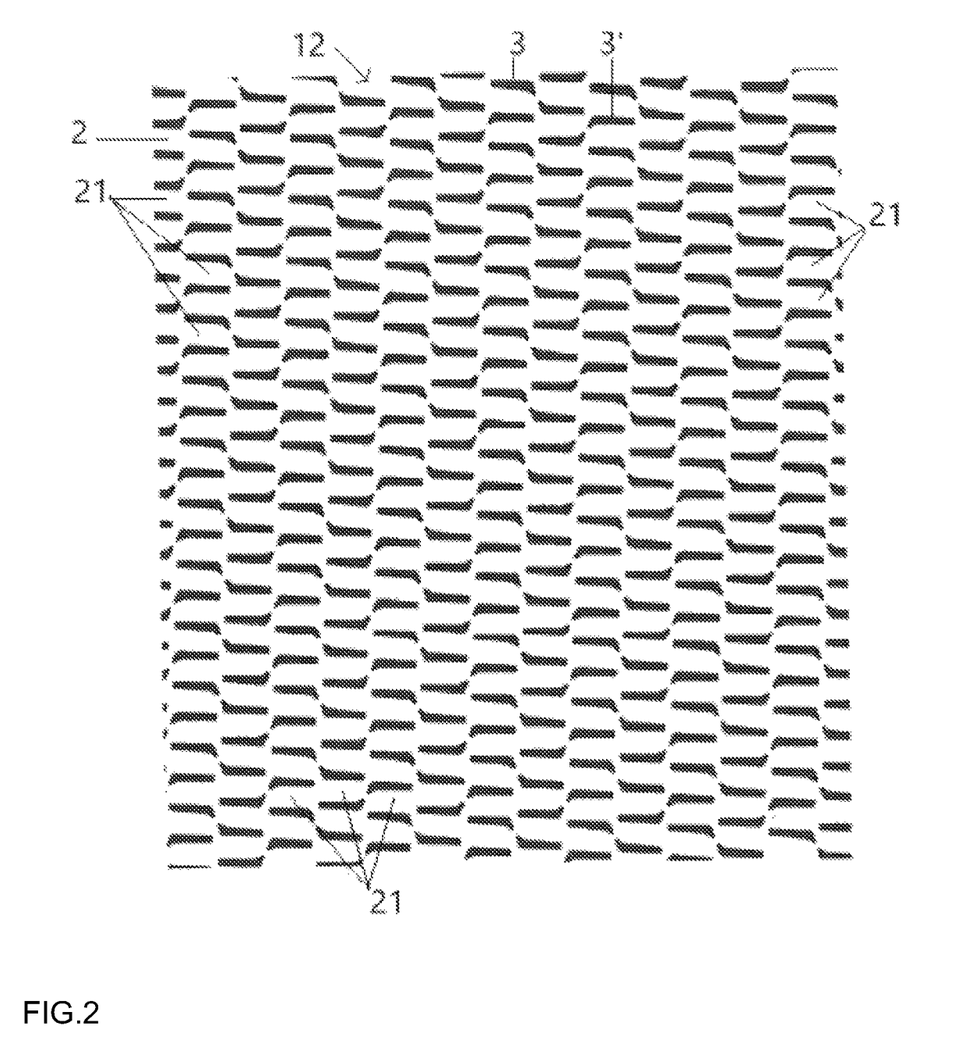
FIG. 2 is a view from above of the laminate in FIG. 1.
Figure 6:
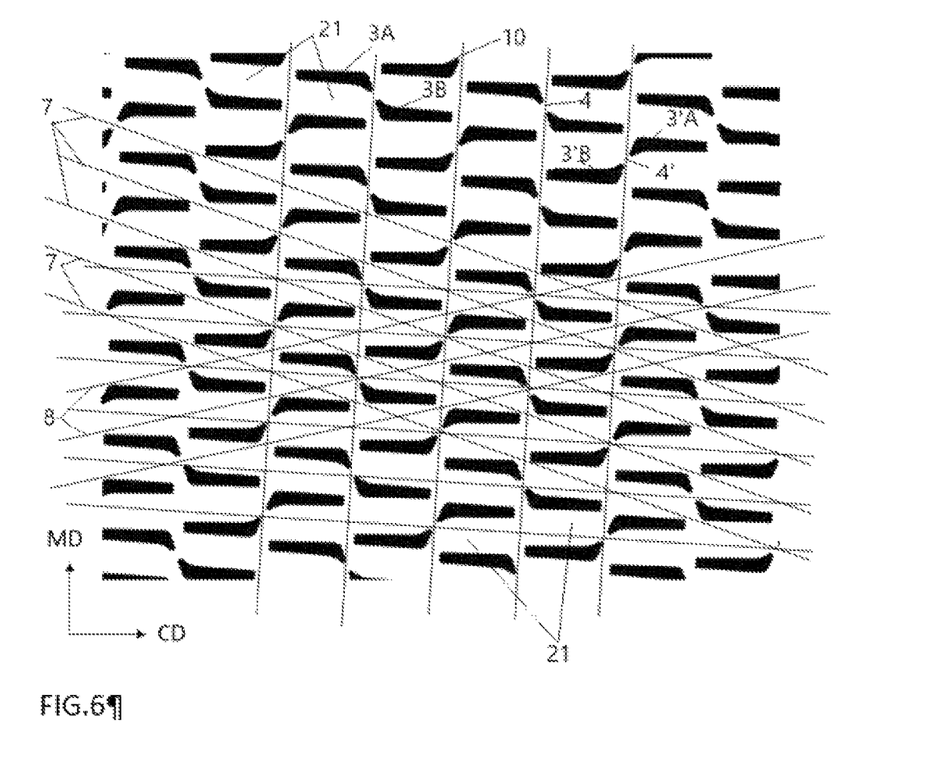
FIG. 6 is an enlarged view of a part of FIG. 2 showing the pathways in the form of straight lines extending from one side of the laminate to the other without intersecting the calendered region.
Figure 7:
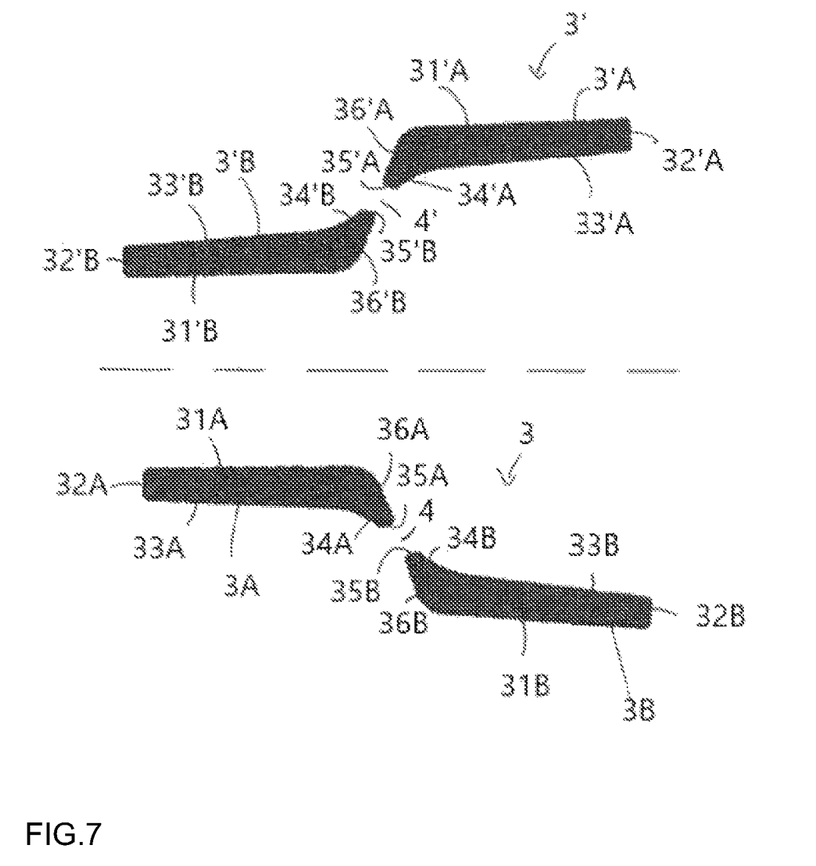
FIG. 7 shows, seen from above on a larger scale, an S-shaped island and an inverse S-shaped island respectively.

FIGS. 2 and 6 shows a view from below of the laminate in FIG. 1 and FIG. 7 shows on a larger scale two inverse S and S islands 3 and 3' respectively.

The islands 3, 3' are arranged on the upper surface of the laminate so that they are aligned with the rows in the direction CD and the columns in the direction MD.

Each inverse S island 3 shown on a larger scale in FIG. 7, consists of two upper and lower sub-islands 3A and 3B, each forming a head of the inverse S in the shape of the island 3. The two sub-islands 3A and 3B forming the head of the S are of an identical shape which is unsymmetrical.

Each inverse S or negative island 3 thus comprises two upper and lower sub-islands 3A and 3B separated by an empty region 4. An empty region 4 is understood to mean that in the interstitial region 4, the two upper and lower sub-islands are spaced apart from each other and fibres and/or filaments of the non-woven fabric 2 with non-calendered loops are present between the two sub-islands 3A and 3B. In the interstitial region 4, loops 21 are then available to engage with the hooks.

The upper sub-island 3A is bounded by a surrounding or peripheral closed line comprising successively an essentially straight upper base section 31A; an intermediate base section 32A essentially perpendicular to the upper section 31A; an essentially straight lower base section 33A extending below the section 31A and slightly inclined to it, in particular at an angle of 3°, which may be between 1° and 10°; a lower tip section 34A inclined downwards with respect to the lower base section 33A, in particular at an angle of 55°, which may be between 45° and 80°; an intermediate tip section 35A inclined upwards with respect to the lower tip section 34A, in particular at an angle of 81°, which may be between 75° and 110°, and an upper tip section 36A, inclined with respect to the intermediate tip section 35A, in particular at an angle of 87°, which may be between 85° and 120°, the upper tip section 36A rejoining the upper support section 31A and inclined to it, in particular at an angle of 70°, which may be between 60° and 90°.

Sections 31A, 32A and 33A define a base part of the sub-island 3A. This base part is terminated by a tip part, bounded by sections 34A, 35A and 36A and facing towards the other respective sub-island 3B of the S.

The lower sub-island 3B is bounded by a closed surrounding line comprising successively an essentially straight lower base section 31B; an intermediate base section 32B essentially perpendicular to the lower section 31B; an essentially straight upper base section 33B extending below the section 31B and slightly inclined to it, in particular at an angle of 3°, which may be between 1° and 10°; an upper tip section 34B inclined upwards with respect to the upper support section 33B, in particular at an angle of 55°, which may be between 45° and 80°; an intermediate tip section 35B, inclined downwards with respect to the upper tip section 34B, in particular at an angle of 81°, which may be between 75° and 110°, and a lower tip section 36B, inclined to the intermediate tip section 35B, in particular at an angle of 87°, which may be between 85° and 120°, the lower tip section 36B rejoining the lower support section 31B and inclined to it, in particular at an angle of 70°, which may be between 60° and 90°.

Sections 31B, 32B and 33B define a base part of the sub-island 3B. This base part ends in a tip part, bounded by sections 34B, 35B and 36B and facing towards the other respective sub-island 3A of the S.

Each S-shaped island 3', shown on a larger scale in FIG. 7, consists of two upper and lower sub-islands 3'A and 3'B, each forming one head of the S of the shape of the island 3'. The two sub-islands 3'A and 3'B forming heads of the S are exactly the same shape which is unsymmetrical.

Each S-shaped, or positive island 3' thus comprises two upper and lower sub-islands 3'A and 3'B separated by an empty region 4'. An empty region 4' is understood to mean that in the interstitial region 4', the two upper and lower sub-islands are spaced apart from each other and fibres and/or filaments of the non-woven fabric 2 with non-calendered loops are present between the two sub-islands 3'A and 3'B.

The upper sub-island 3'A is bounded by a closed surrounding or peripheral line comprising successively an essentially straight upper base section 31'A; an intermediate base section 32'A essentially perpendicular to the upper section 31'A; a lower, essentially straight base section 33'A extending under section 31'A and slightly inclined to it, in particular at an angle of 3°, which may be between 1° and 10°; a lower tip section 34'A inclined downwards to the lower base section 33'A, in particular at an angle of 55°, which may be between 45° and 80°; an intermediate tip section 35'A, inclined upwards with respect to the lower tip section 34'A, in particular at an angle of 81°, which may be between 75° and 110°; and an upper tip section 36'A, inclined to the intermediate tip section 35'A, in particular at an angle of 87°, which may be between 85° and 120°, the upper tip section 36'A rejoining the upper base section 31'A and inclined to it, in particular at an angle of 70°, which may be between 60° and 90°.

Sections 31'A, 32'A and 33'A define a base part of sub-island 3'A. This base part is terminated by a tip part, bounded by sections 34'A, 35'A and 36'A and facing towards the other respective sub-island 3'B of the S.

The lower sub-island 3'B is bounded by a closed surrounding or peripheral line comprising successively an essentially straight lower base section 31'B; an intermediate base section 32'B essentially perpendicular to the lower section 31'B; an essentially straight upper base section 33'B extending above section 31'B and slightly inclined to it, in particular at an angle of 3°, which may be between 1° and 10°; an upper tip section 34'B inclined upwards with respect to the upper base section 33'B, in particular at an angle of 55°, which may be between 45° and 80°; an intermediate tip section 35'B, inclined downwards with respect to the upper tip section 34'B, in particular at an angle of 81°, which may be between 75° and 110°; and a lower tip section 36'B, inclined with respect to the intermediate tip section 35'B, in particular at an angle of 87°, which may be between 85° and 120°, the lower tip section 36'B rejoining the lower support section 31'B and inclined to it, in particular at an angle of 70°, which may be between 60° and 90°.

Sections 31'B, 32'B and 33'B define the base part of sub-island 3'B. This base part is terminated by a tip part, bounded by sections 34'B, 35'B and 36'B facing towards the other respective sub-island 3'A of the S.

The two tip parts of the two sub-islands 3A and 3B form with the empty interstitial part 4 the intermediate bar of the S of the overall shape of the negative island 3.

The two tip parts of the two sub-islands 3'A and 3'B form with the empty interstitial part 4' the intermediate bar of the S of the overall shape of the positive island 3'.

Thus each of the sub-islands 3A, 3B, 3'A and 3'B has an unsymmetrical shape, and in particular, when viewed from above is not symmetrical with respect to a straight line and/or a point, while each of the islands 3 and 3' is symmetrical with respect to a point at the centre of the interstitial part 4, 4'.

The shape of a positive island 3' consists of two sub-islands 3'A and 3'B and an interstitial part 4' is the mirror image of a negative island 3, consisting of two sub-islands 3A and 3B and an interstitial part 4.

As shown in the diagrams, the negative and positive islands 3 and 3' are arranged in rows (in a direction forming an angle of between 0° and 10° with direction CD) and in columns (in a direction or axis 10 forming an angle of between 0° and 10° with direction MD).

A given row comprises a succession of positive and negative islands and the following and preceding rows comprise a succession of negative and positive islands, the rows thus being rows of negative and positive islands alternately.

Furthermore, between each row, is an island offset by the width of a sub-island, so that each column comprises successively alternating upper sub-islands of a positive and negative island, while the preceding and following columns comprise successively alternating lower sub-islands of a positive and negative island. This offsetting of sub-islands results in a vertical alignment (in the direction MD or the direction of the columns slightly inclined to the direction MD) alternating with an intermediate region 4 of a negative island and an intermediate region 4' of a positive island.

However, this offset may be greater than the width of a sub-island, so that the mutual overlapping in a column, either of upper sub-islands 3A and 3'A alternately, or of lower sub-islands 3B and 3'B alternately, is between 20% and 50% of the total width of a whole island, preferably between 30% and 50% (50% corresponding to the case of the offset of the width of a sub-island shown in the drawings). In addition, between each row, there is an offset between a positive island and a negative island so that there is no mutual overlapping of a row with an adjacent row, either a lower sub-island 3B with an upper sub-island 3'A, or an upper sub-island 3A with a lower sub-island 3'B.

Thus a given column comprises only either upper or lower sub-islands, alternating from one column to another, and in a given column, the sub-islands alternate with either a positive island or a negative island.

As can be seen in FIG. 6, this arrangement of islands is such that it is possible to draw vertical lines in the direction of the centre line 10 of the columns, inclined at 0° to 10° to the direction MD, parallel to each other and spaced apart by about the length of a sub-island, either upper or lower, depending on the column chosen, as well as inclined parallel lines 7 and 8 that enable the laminate to be crossed at an angle to direction CD and direction MD, without encountering any calendered region.

The two sets of inclined parallel lines 7 and 8 intersect, in particular forming between each other an angle different from 90°, in particular between 10° and 45°, in particular of the order of 32°. Advantageously, each set of lines 7 and 8 forms an angle of between 65° and 85° respectively with the axis of the columns, preferably of the order of 75°. The various dimensions and/or straight lines can be taken in a sample region comprising three islands in MD and three islands in CD.

In particular, the dimensions of the islands are such that:
The length of sections 32A, 32B, 32'A, 32'B is about 1.06 mm, in particular between 0.8 mm and 1.5 mm.
The length of sections 31A, 31B, 31'A, 31'B is about 6.5 mm, in particular between 4 mm and 10 mm, in particular between 5 mm and 8 mm.
The length of sections 33A, 33B, 33'A, 33'B is about 6.0 mm, in particular between 4 mm and 10 mm, in particular between 5 mm and 8 mm.
The length of sections 36A, 36B, 36'A, 36'B is about 1.9 mm, in particular between 0.8 mm and 3.0 mm, in particular between 1 mm and 2.5 mm.
The distance between the two intermediate tip sections 35A and 35B, 35'A and 35'B respectively, bounding the interstitial region 4 or 4' is about 0.93 mm, in particular between 0.5 mm and 2.5 mm, preferably between 0.8 mm and 1.5 mm.
The ratio of the longest length in the direction MD of the island to the longest length in direction CD of the island is between 0.1 and 1.0, preferably between 0.2 and 0.6.
The ratio of the longest length in the direction MD of a sub-island to the longest length in direction CD of the sub-island is between 0.1 and 0.6, preferably between 0.1 and 0.4.
The ratio of the longest length in the direction MD of the group comprising a positive island and a negative island to the longest length in direction CD of this assembly is between 0.15 and 1.4, preferably between 0.25 and 1.0.
The length of the intermediate tip sections 35A, 35B, 35'A, 35'B is about 0.53 mm, in particular between 0.4 mm and 0.6 mm.
In the rows and columns, there is an island density of between 150 and 350 sub-islands/per column meter, for example 242, and from 80 to 200 sub-islands/per row meter, for example 129.

Figure 3:
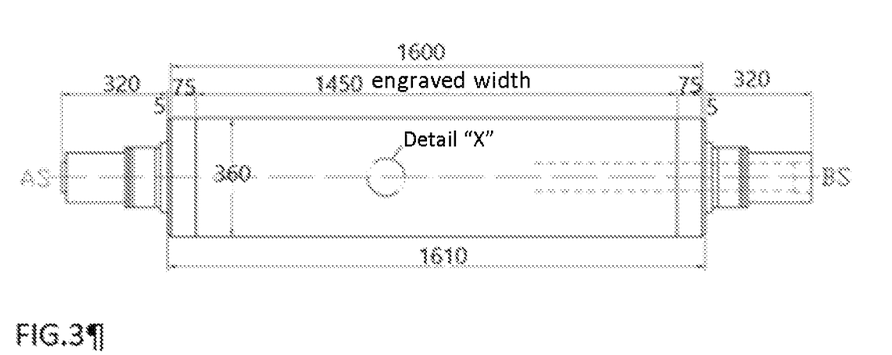
FIG. 3 is a front view of an engraved roller according to the invention.
Figure 4:
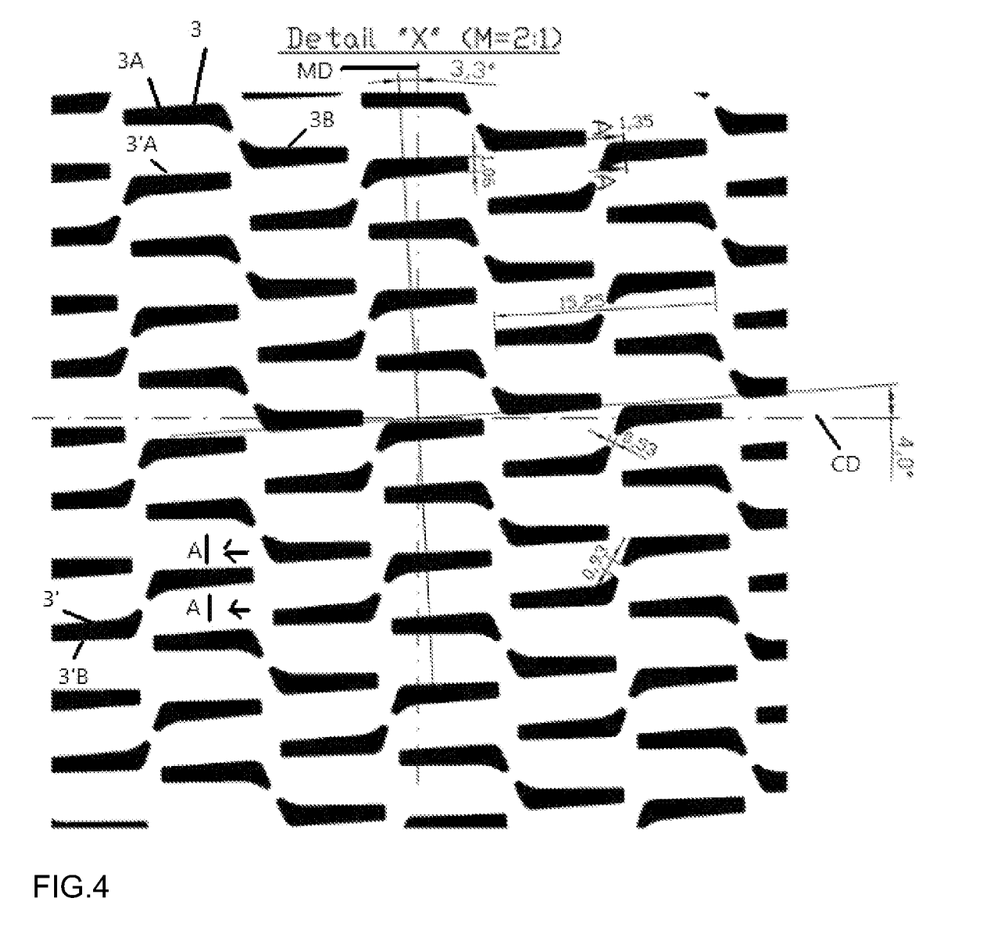
FIG. 4 is an enlarged view of the circled part in FIG. 3.
Figure 5:
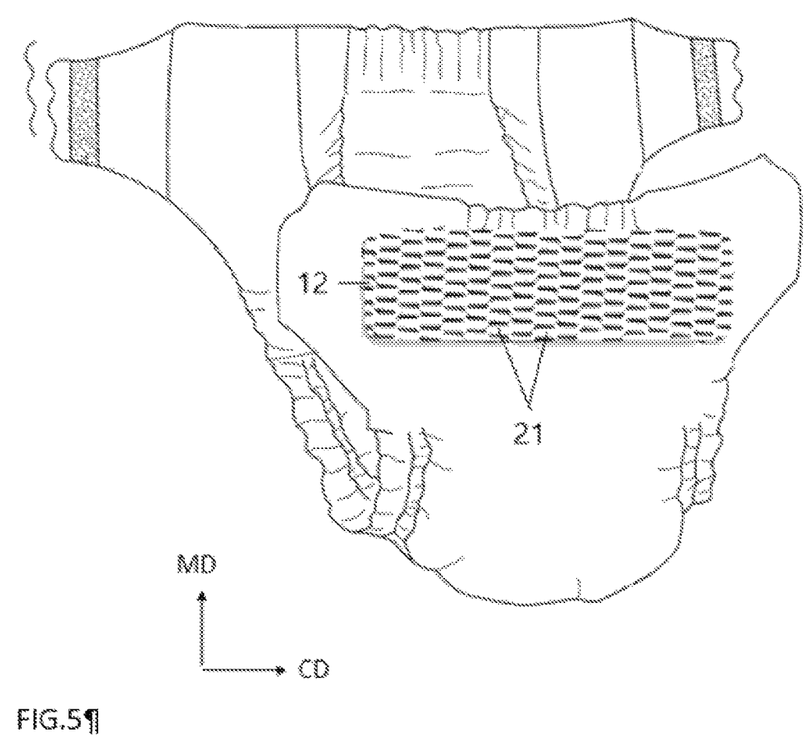
FIG. 5 is a perspective view of a diaper incorporating the laminate in FIGS. 1 and 2 to form a landing region designed to work with the hooks projecting from the lateral tabs to close the belt of the diaper removably.

FIG. 3 shows an engraved roller including embossing details as shown in FIG. 4.

For manufacturing the laminate, the two components 1 and 2 were passed together between two rollers to fix them to one another by calendering. According to one variant, printing could be on the lower surface of the support component 1, before or after calendering.

In the interstice formed between the two rollers, in particular the upper and lower rollers, the two components 1 and 2 are pressed together by the respective external surfaces of one or other of the two rollers.

One or both of the two rollers is/are heated and one of the two rollers includes an engraved pattern.

Furthermore, the respective speeds of the two lower and upper rollers at the point of contact with the laminate passing through the gap are oriented mutually parallel, in the direction of passage of the two components, in particular the machine direction or MD. However, the speed V1 of the engraved roller, in particular the upper roller, at the point of contact with the looped fabric component in the gap is greater than the speed V2 of the support roller, in particular the lower roller, that is the roller in contact with the support component. To produce the laminate in FIG. 1, the ratio V1/V2 in FIG. 3 is adjusted to 1.15.

In the present invention, non-woven fabric is understood to mean a product produced as the result of the formation of a web of fibres and/or filaments that has been consolidated. Consolidation may be mechanical, chemical or thermal and occurs due to linkage between the fibres and/or filaments. Consolidation may be direct, that is made directly between the fibres and/or filaments by welding, or indirectly, that is by means of an intermediate layer between the fibres and/or filaments, for example a layer of adhesive or a bonding layer. The term non-woven fabric refers to a structure in the form of a strip or web of fibres and/or filaments that is interlaced in a non-uniform, irregular or random manner. A non-woven fabric may have a single or multi-layer structure. A non-woven fabric may also be bonded to another material such as a film to form a laminate. A non-woven fabric may be produced from different synthetic and/or natural materials. Natural materials, for example are cellulose fibres, such as cotton, jute, pulp, flax or the like and may also include processed cellulose fibres, such as rayon or viscose (cellulose acetate). Natural fibres for a non-woven fabric material may be produced by various processes such as carding. Synthetic materials for example include, but are not limited to, thermoplastic synthetic polymers that are used to form fibres and/or filaments that include, but are not limited to, polyolefins, for example polyethylene, polypropylene, polybutylene and the like; polyamide, for example polyamide 6, polyamide 6.6, polyamide 10, polyamide 11, polyamide 12 and the like; polyesters, for example polyethylene terepthalates, polybutylene terepthalates, polylactic acids (PLA) and the like, polycarbonates, polystyrenes, thermoplastic elastomers, vinyl polymers, polyurethanes and mixtures and co-polymers of the latter. Certain of these materials may be bio-plastic, for example bio-sourced (for example Bio-PE, PLA, polyamide 11, viscose (cellulose acetate), and the like) and/or biodegradable (PLA and the like).

In general, fibres and filaments differ mainly in their length and their manufacturing process.

Filaments are understood to be unitary elements, with very high length to diameter ratio involving their cross section, extruded continuously to directly form a web of non-woven fabric that may then be consolidated by thermal bonding or any other method to achieve its desired performance and/or for transportation. Preferably, filaments have a length of greater than 120 mm.

Fibre is the generic term to describe a textile material, or a component of a textile material of lower length than the length of filaments, and able to be spun and/or used in the manufacture of non-woven fabrics. There are two types of fibre, short fibres formed from discontinuous material shorter than 50 mm (preferably from 25 mm to 50 mm) and very long fibres formed discontinuously with lengths greater than 50 mm (preferably from 60 mm to 120 mm).

The difference between filaments directly consolidated after extrusion is that fibres are commonly oriented and organised into a web during a carding process well known in the art. This web may then be consolidated by thermal bonding or any other method to achieve its desired performance and/or for transportation. According to the invention, a non-woven fabric with loops comprising highly elongated fibres can be used with advantage. According to the invention, a non-woven fabric with loops or a non-woven fabric support comprising fibres and/or filaments with a cross circular or non-circular section (trilobal or multilobal) can be used with advantage. The use of non-circular fibres and/or filaments gives a bright appearance.

According to the invention, a non-woven fabric with loops or a non-woven support fabric comprising single material or multicomponent fibres and/or filaments ("Core/Sheath" or "side/side") can be used with advantage.

Highly elongated fibres are understood to mean fibres with an ultimate tensile strength greater than 250% of the elongation, that is fibres that can be stretched to at least 2.5 times their length at rest before stretching.

More particularly, highly elongated fibres have an ultimate tensile strength greater than 300% of elongation, or even with an ultimate tensile strength between 300% and 600% of elongation, more particularly between 350% and 500% of elongation.

According to one method of implementation, non-woven fabric with loops comprises highly elongated fibres, in particular with at least 50% highly elongated fibres.

According to the present invention, a loop is understood to mean a filament and/or fibre with both ends bonded to the support at a respective point of the support or at the same point of support. A loop may also be formed from several filaments or fibres joined to one another and of which two of them are bonded to the support, at one point or at two respective different points. Loops may have a particular unsymmetrical shape in this case (see FIG. 1).

Non-woven fabric with loops is understood to mean a non-woven fabric forming loops available for a hook after fastening (assembly/fixing/calendering) to the support.

In one variant, activating the non-woven fabric with loops before fixing it to the component is a possibility. Activation of the non-woven fabric is a treatment that reduces the cohesion of the structure of the layer of non-woven fabric, and releases the fibres and/or filaments. Activation may also be achieved with two activation rollers with teeth or discs, as is well known in this field.

The direction MD is the Machine direction, that is the direction in which the laminate was transported to the production line during calendering and the direction CD is the Transverse or "Cross" direction, perpendicular to the direction MD.

Figure 8:
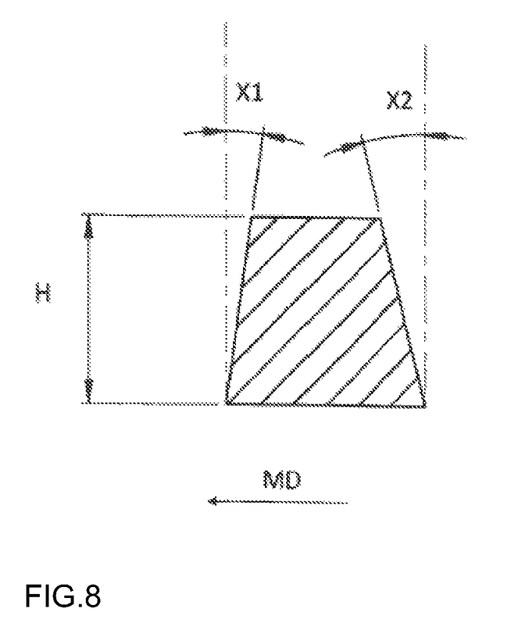
FIG. 8 is a cross sectional view on AA in FIG. 4.

FIG. 8 shows a tooth of the engraved roller that has an entry angle (in the direction MD) and an exit angle. The entry angle X1 is preferably lower than the exit angle X2 to leave more room for the formation of a loop and prevent damaging the fibres and/or filaments during the calendering stage. Preferably, the entry angle is between 5° and 14°, more particularly of the order of 8°. The exit angle is between 10° and 22°, in particular of the order of 14°.

The invention claimed is:

1. A laminate comprising a support component in the form of a first web of fibres and/or filaments, and a component with loops in the form of a second web of fibres and/or filaments, the two components being fixed to one another, wherein the fixing causes S-shaped calendering islands to appear on the exterior surface of the component with loops in the shape of an S with two symmetrical heads, characterised in that each S-shaped calendering island consists of two sub-islands forming said symmetrical heads and an intermediate, non-fixed region separating the two sub-islands forming said symmetrical heads, each sub-island being delimited by a respective closed peripheral line all the points of which being in contact with said sub island.

2. The laminate according to claim 1, characterised in that the shape of each sub-island is without symmetry, neither with respect to a point, nor a straight line.

3. The laminate according to claim 1, characterised in that the two sub-islands of each island are of the same shape.

4. The laminate according to claim 2, characterised in that each unsymmetrical sub-island comprises an essentially elongated base part and a spout part projecting from the base part and extending in a direction forming an angle with respect to the length direction of the base part at an angle of between 30° and 60°.

5. The laminate according to claim 4, characterised in that each closed peripheral line comprises an essentially straight first base section; a second essentially straight base section slightly inclined to the first base section at an angle between 1° and 10°; an intermediate base section extending from an edge between the first and second base sections and a section forming a tip extending from another side between the first and second base sections with an end point opposite the first base section with respect to the second base section.

6. The laminate according to claim 5, characterised in that the section forming the tip comprises a first tip section inclined to the second support section in the direction opposite to the first base section at an angle between 45° and 80° and a second tip section; the first and second tip sections rejoining opposite the intermediate base section inclined to the first tip section and towards the edge of the first base section at an angle between 75° and 110°; the second tip section being inclined to the intermediate tip section at an angle between 85° and 120°, the second tip section rejoining the first base section and being inclined to it at an angle between 60° an 90°.

7. The laminate according to claim 5, characterised in that the intermediate base section is essentially perpendicular to the first base section.

8. The laminate according to claim 1, characterised in that the S-shaped calendering islands are aligned in rows and columns, in directions each inclined at an angle of between 1° and 10° to the machine-direction (MD) and the cross-direction (CD) respectively.

9. The laminate according to claim 1, characterised in that the arrangement of the islands on the upper surface of the laminate is such that it is possible to draw straight lines crossing the upper surface of the laminate in at least three different directions without encountering any calendered region.

10. The laminate according to claim 8, characterised in that there are two types of island, namely a type of island in the shape of an S, called positive, and a type of island in the shape of an inverse, or mirror image S, called negative, a given row comprising a succession of positive or negative islands and the following and preceding rows comprising a succession of negative or positive islands, the rows thus being alternately rows of negative islands and positive islands.

11. The laminate according to claim 10, characterised in that, between each row, there is an island offset by a sub-island, so that each column comprises an alternating succession of sub-islands of a positive island and a negative island, while the preceding and following columns comprise sub-islands of an alternating succession of a positive island and a negative island.

12. The laminate according to claim 1, characterised in that the area of the non-woven fabric with loops covered by calendering islands is between 18% and 34% of the area of the non-woven fabric with loops.

13. An engraved roller designed to hot press the first web of fibres and/or filaments and the component with loops in the form of a second web of fibres and/or filaments against each other to fasten them together, the engraved roller comprising patterns projecting from the external surface, the patterns having shapes that match the S-shaped calendering islands of the laminate according to claim 1.

14. A calendering facility for a laminate, the facility comprising a support roller and an engraved roller according to claim 13.

15. The facility according to claim 14, characterised in that the peripheral speed of the engraved roller is adjusted to be higher than the peripheral speed of the support roller by a ratio of between 1.1 and 1.5.

16. The laminate according to claim 4, wherein said essentially elongated base part is elongated in the cross-direction (CD), wherein the spout part projects from an end of the base part, and wherein the spout part forms a 45° angle with respect to the length direction of the base part.

17. The laminate according to claim 5, wherein the second essentially straight base section is slightly inclined to the first base section at an angle of 3°.

18. The laminate according to claim 6, wherein the first tip section is inclined to the second support section in the direction opposite to the first base section at an angle of 55°, wherein the first and second tip section are rejoined opposite the intermediate based section by an intermediate tip section at an angle of 81°, wherein the second tip section is inclined to the intermediate section at an angle of 87°, and wherein the second tip section rejoins the first base section at an angle of 70°.

19. The laminate according to claim 9, wherein it is possible to draw straight lines crossing the upper surface of the laminate in four different directions.

20. The laminate of claim 1, wherein the first web of fibers and/or filaments is a first nonwoven fabric and the second web of fibers and/or filaments is a second non-woven fabric with loops.

21. A laminate comprising a support component in the form of a first web of fibres and/or filaments, and a component with loops in the form of a second web of fibres and/or filaments, the two components being fixed to one another, wherein the fixing causes so-called calendering islands to appear on the exterior surface of the component with loops in the shape of an S with two symmetrical heads, characterised in that each S-shaped island with two symmetrical heads comprises two sub-islands forming said symmetrical heads and an intermediate, non-fixed region separating the two sub-islands forming said symmetrical heads, each sub-island being delimited by a respective closed peripheral line all the points of which being in contact with said sub island, a shortest distance between the two sub-islands being smaller than a largest distance to be measured between any two points of each of said closed peripheral lines.

* * * * *